J. W. WESTON.
Velocipede.

No. 88,759.                          Patented April 6, 1869.

Witnesses                                Inventor

JAMES W. WESTON, OF NEW YORK, N. Y.

Letters Patent No. 88,759, dated April 6, 1869.

IMPROVEMENT IN VELOCIPEDE.

The Schedule referred to in these Letters Patent and making part of the same.

*To all whom it may concern:*

Be it known that I, JAMES W. WESTON, of the city and State of New York, have invented and made a new and useful Improvement in Velocipedes; and I do hereby declare the following to be a full, clear, and exact description of the said invention, reference being had to the annexed drawing, making part of this specification, wherein—

Figure 1:
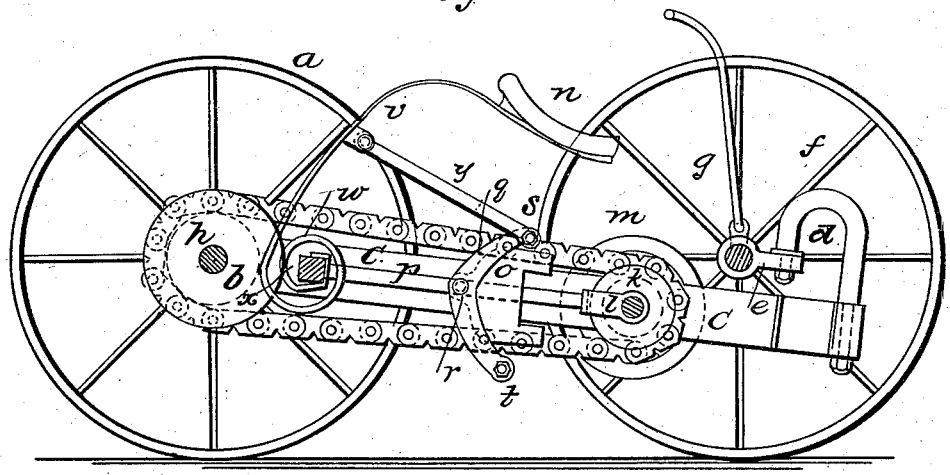
Figure 2:
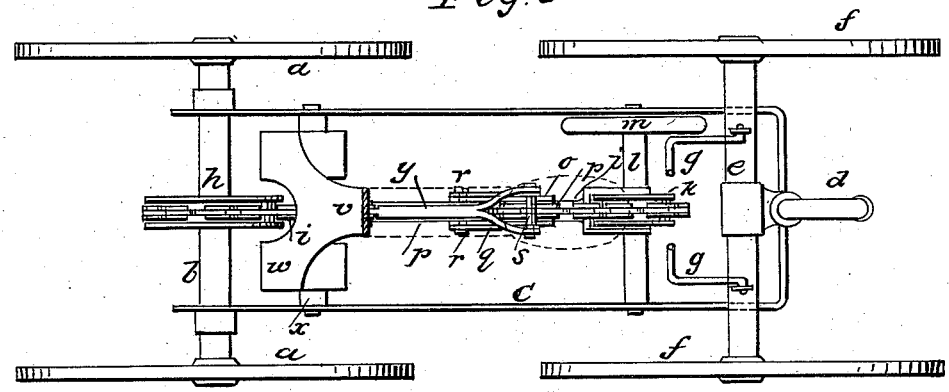

Figure 1 is a side view of the said velocipede, the near wheels being removed, and Figure 2 is a plan, the seat being removed, but shown by red lines.

Similar marks of reference denote the same parts.

This invention relates to an endless chain, applied to rotate the driving-wheels, in combination with a double-acting clamp, fitted to slide, and actuated by a connection to a spring-seat, in such a manner, that when the weight of the person rests upon the seat and carries that down, the clamp grasps the endless chain at one side, carrying it along, and as the person rises on his feet, the other part of the clamp takes the other side of the chain, and the springs of the seat continue the movement imparted to the chain, to keep up the revolution of the wheels of the velocipede.

In the drawing, $a$ $a$ are the hind wheels, attached to the axle, or shaft $b$, that passes through bearings in the side pieces $c$ $c$ of the frame, and at the front end of the frame are a draught-hook, and pivot, $d$, to which the front axle $e$ is connected, and on which it swings.

$f$ $f$ are the front wheels, and $g$ is the steering-bar, or loop.

Upon the axle $b$ is a chain-wheel, $h$, around which the endless chain $i$ passes to the forward chain-wheel $k$, that is on a shaft, $l$, set in the frame $c$, and having a fly-wheel, $m$, to aid in maintaining the movement.

The chain-wheels $h$ and $k$ are to have internal projections, to fit the links of the chain, or other devices, to prevent the chain slipping, and the chain may be made in any desired manner, or a belt take the place of a chain.

The shaft $l$ may be set in movable bearings, to adjust the same, and tighten the belt.

I provide a slider, $o$, set to move upon the stationary slide or bar $p$, and at the sides of said slider there are grooves, in which the chain $i$ is received.

The clamp for the chain is made of the bent levers $q$, upon the fulcrum-pins $r$, on the slider $o$.

$s$ and $t$ are clamping-pawls, placed between the respective ends of the levers $q$, so as to stand across and over and below the chain $i$.

$u$ is a seat, set upon a spring, or spring-arm, $v$.

I have shown the volute springs $w$ as applied to the bar $x$, and these are to be of a character to nearly support the weight of the lightest person to which the velocipede is adapted.

From the seat-piece $u$, a rod, or forked bar, $y$, connects with the levers $q$, at the clamping-pawl $s$.

The seat $u$ may be thrown up by spiral or other springs, instead of the volute springs shown.

It will now be understood that the rider rises and falls his body, his feet resting on $c$, and as the seat $u$ is pressed down by his weight, the pawl $s$ clamps the chain against the upper side of the slider $o$, and carries said slider, chain, and clamp along by the action of the bar $y$, propelling the vehicle, and as the rider rises on his feet, the spring or springs throw up the seat, the levers $q$ swing so that the clamping-pawl $t$ takes the chain and moves the same along with the slider, continuing the motion of the vehicle.

The rider can so bear his weight on his feet, that neither of the pawls $s$ or $t$ will be in contact, and he can allow the vehicle to run without working the parts.

By keeping either of the clamping-pawls in contact with the belt, they act as a brake.

A single front wheel may be employed, by carrying the frame $c$ up and over the said front wheel, and holding the wheel in jaws that are pivoted through said frame.

The seat may be stationary, and a lever, acted upon by the hand or by the feet, may be used to swing the clamping-pawls, and move the slider and chain endwise.

What I claim, and desire to secure by Letters Patent, is—

1. The endless chain, or belt, applied to the chain-wheel of the driving-wheels, in combination with the slider $o$, levers $q$, clamping-pawls $s$ $t$, and spring-seat $u$, substantially as and for the purposes set forth.

2. The clamping-pawls $s$ $t$, and slider $o$, in combination with the endless chain and wheels of a velocipede, substantially as and for the purposes set forth.

In witness whereof, I have hereunto set my signature, this 11th day of March, A. D. 1869.

J. W. WESTON.

Witnesses:
CHAS. H. SMITH,
GEO. T. PINCKNEY.